Aug. 26, 1941.  A. P. KEARNS  2,253,711
CHANGE SPEED GEARING
Filed Aug. 25, 1937  4 Sheets-Sheet 1

Inventor
Anthony P. Kearns
By Cushman Darby & Cushman
Attorneys

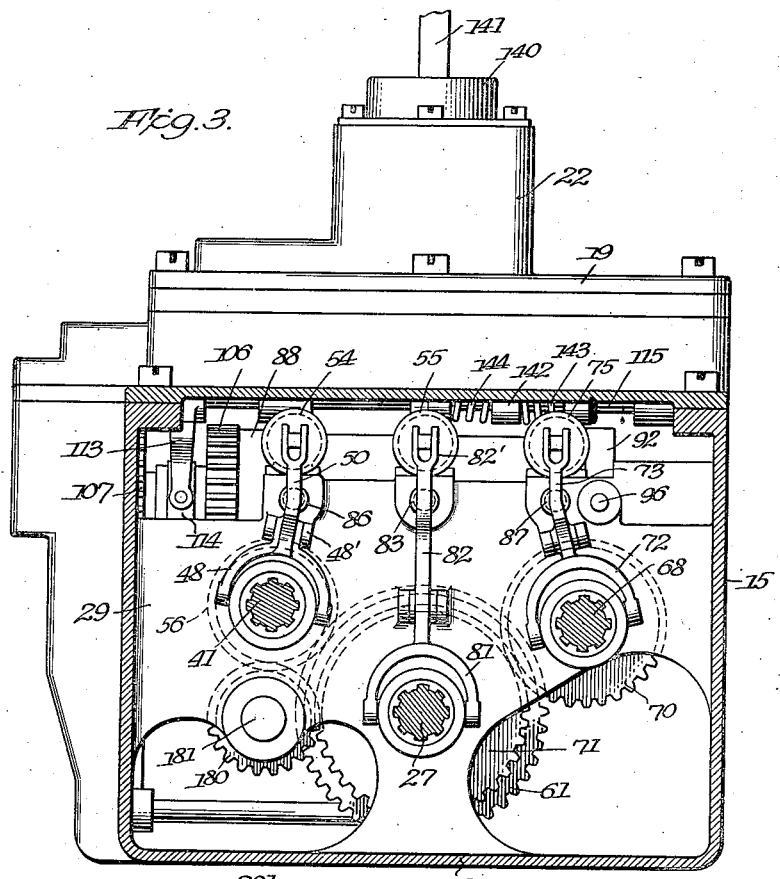
Fig.3.
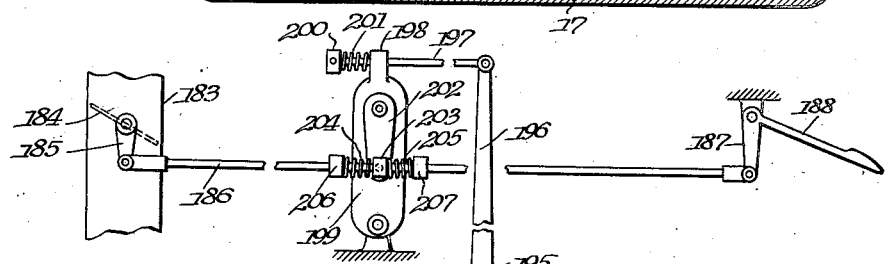
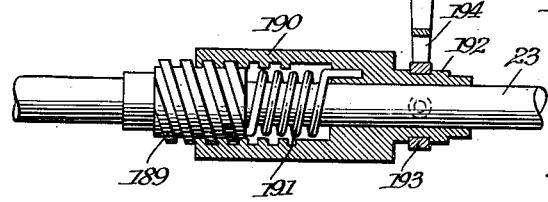
Fig.6.
Inventor
Anthony P. Kearns
By Cushman Darby & Cushman
Attorneys Aug. 26, 1941. A. P. KEARNS 2,253,711
CHANGE SPEED GEARING
Filed Aug. 25, 1937 4 Sheets-Sheet 4

Inventor
Anthony P. Kearns
By Cushman Darby & Cushman
Attorneys

Patented Aug. 26, 1941

2,253,711

UNITED STATES PATENT OFFICE 2,253,711

CHANGE SPEED GEARING

Anthony P. Kearns, Basking Ridge, N. J.

Application August 25, 1937, Serial No. 160,915

12 Claims. (Cl. 74—336)

The present invention relates to transmission mechanism by means of which a driven shaft may be rotated at different speeds relative to a drive shaft from which it receives its drive. According to the invention, change speed operations may preferably be effected either automatically or manually, and, with the automatic means operative, shifting is preferably effected in dependence both upon the speed of the driven shaft and also in dependence upon conditions of torque input and load variation.

In the embodiment of the invention to be hereinafter described, I employ constant mesh gears and selectively operable clutches for controlling the transmission ratio. To prevent racing of the prime mover during the period in which one clutch is disengaged and another engaged, the invention contemplates automatic speed control mechanism for the prime mover to take care of this contingency.

Since the invention will be best understood from the description of a specific embodiment, I shall proceed to describe it with reference to the illustrative embodiment shown in the accompanying drawings, in which:

Figure 3 is a section substantially on line 3—3 of Figure 2.

Figure 6 is a diagrammatic view of the speed control mechanism for the prime mover.

Figure 7 shows in face view one element of certain lost motion mechanism of which the other is shown in face view in Figure 7a.

Figure 8 shows in face view one element of further lost motion mechanism of which the other is shown in face view in Figure 8a.

Figure 9 shows in end elevation a cam drum which constitutes direct selecting means for the change speed clutches.

Figure 1:
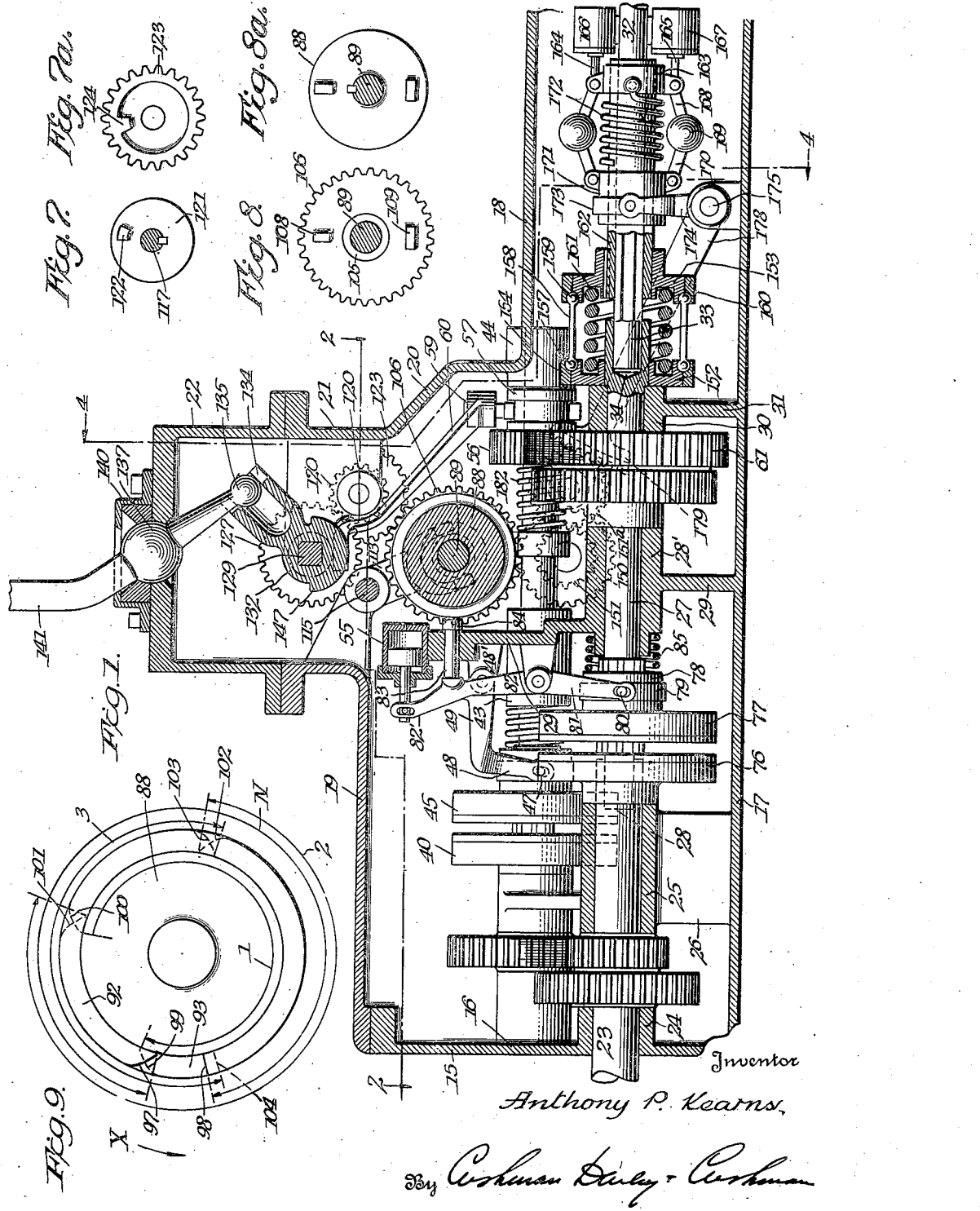
Figure 1 is a longitudinal vertical section of speed changing mechanism embodying the invention, the mechanism shown providing three speeds forward and reverse.

Referring to the drawings, reference numeral 15 designates generally a housing in which the speed changing mechanism is arranged. As here shown, the housing is substantially in the form of a box having a front end wall 16, side walls, a bottom wall 17, a reduced rear portion having a top wall 18, and a forward removable top wall portion 19 defining, with a rear wall portion 20, a neck portion 21 which is surmounted by a removable cap portion 22. The drive shaft 23, which may be driven from any suitable prime mover such as an internal combustion engine is supported in a bearing 24 on wall 16 and in a bearing 25 supported on a pedestal 26 rising from the bottom wall 17. The driven shaft has a forward section 27 having a reduced forward extremity 28 journaled in a bore in the rear end of the shaft 23, shaft 27 being journaled also in a bearing 28' formed in a vertical web 29 and in a bearing 30 formed in a vertical web 31. The driven shaft also includes a rear section 32 having its forward end 33 rotatably received in a bore 34 in the rear end of shaft section 27. Shafts 23, 27 and 32 are in axial alignment. The latter two are connected by means of mechanism which will be hereinafter described, while shafts 23 and 27 are adapted to be so connected that the latter may be rotated from the former at the same speed thereof or at other speeds.

Figure 2:
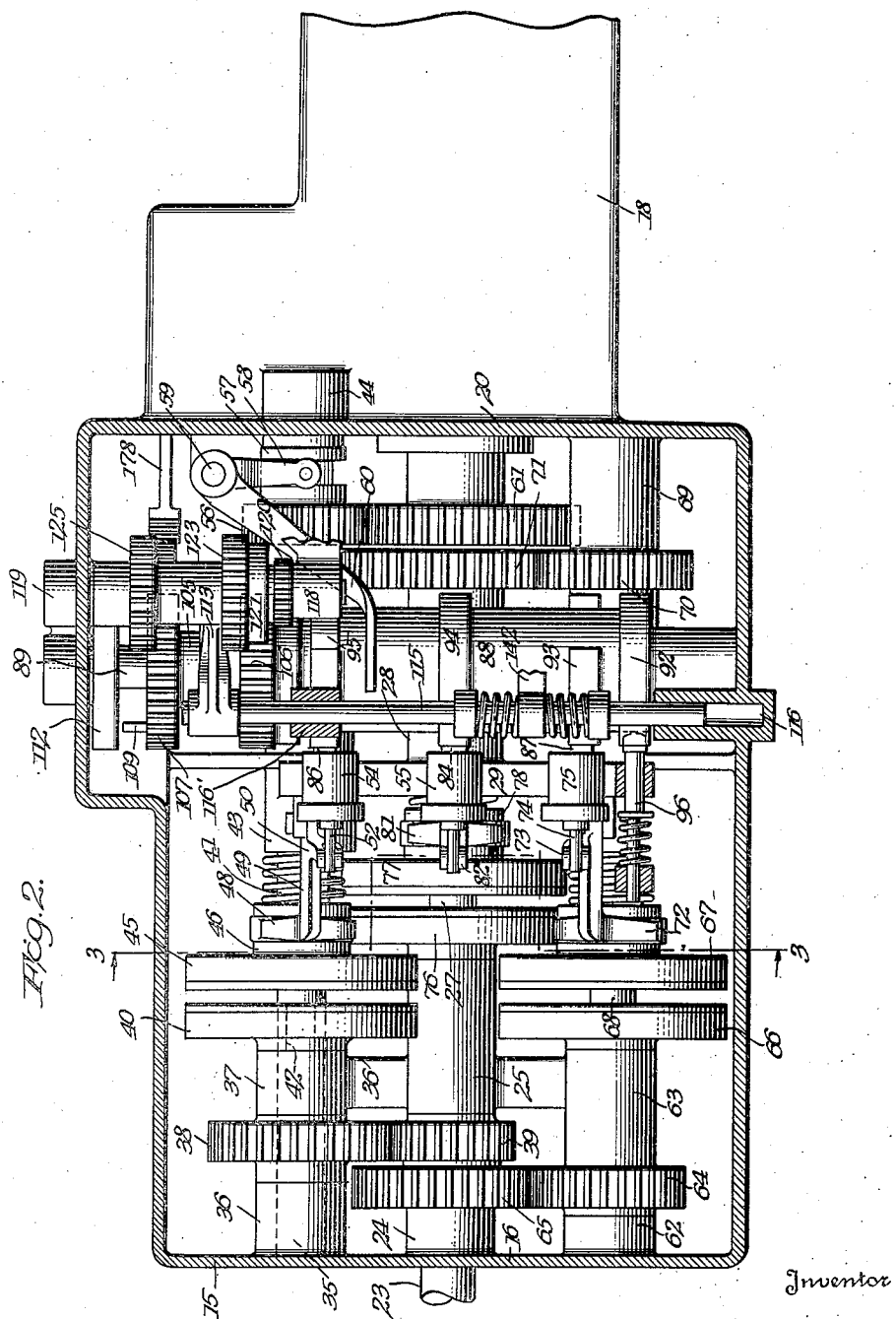
Figure 2 is a section substantially on line 2—2 of Figure 1.

A counter-shaft 35, Figure 2, is arranged parallel to shaft 23 at one side thereof and somewhat thereabove, shaft 35 being rotatable in a bearing 36 on end wall 16 and in a bearing 37 supported on an arm 36' projecting laterally from bearing 25. Intermediate the bearings 36 and 37 a gear 38 is fixed on shaft 35 and meshes with a smaller gear 39 fixed on shaft 23. On the rear side of bearing 37, shaft 35 has fixed thereto a friction clutch plate 40, as here shown.

A shaft 41 in alignment with shaft 35 has a reduced forward end 42 journaled in a bore in the rear end of shaft 35, shaft 41 being otherwise rotatable in a bearing 43 carried by web 29 and in a bearing 44 which projects slightly rearwardly of wall 20. A friction clutch plate 45 is splined on shaft 41 for cooperation with plate 40. Plate 45 has a hub 46 provided with an annular groove in which is disposed a shipper ring having horizontally projecting pins, of which one is shown at 47, Figure 1, engaged in slots in the extremities of a yoke 48 which projects downwardly from the extremity of one arm 49 of a bell crank lever whose other arm 50, Figures 2 and 3, projects upwardly. The lever is pivoted between ears 48' projecting forwardly from web 29. The axis of the pins engaged by the yoke is inclined somewhat to the horizontal, as shown in Figure 3, in order that arm 50 may be positioned inwardly of the housing with reference to the vertical axial plane of shaft 35, this being for the purpose of compactness. The upper end of arm 50 is bifurcated and provided with aligned slots in which are engaged the ends of a pin passed through a piston rod 52 secured to a piston which is reciprocable in a cylinder 54 secured to the upper portion of web 29. The piston and cylinder constitute a dashpot which has a restricted escape vent which, if desired, may have an adjustable escape valve therein. The piston is valved so as to permit it to move freely to the left, Figure 1, movement of the piston to the right being retarded by reason of the restricted escape vent.

An example of such a valved piston is disclosed in United States Patent No. 1,426,460, issued to Cheney, August 22, 1922.

A relatively small gear 56 is splined on the rear portion of shaft 41 and has a hub portion 57 engaged by suitable shifting means including a yoke 58 secured to a pivotal vertical shaft 59 to the upper end of which is fixed a forwardly extending arm 60. Gear 56 engages a relatively large gear 61 fixed on shaft 27.

A shaft similar to shaft 35 is journaled in bearings 62 and 63 on the opposite side of shaft 23 and has fixed thereon a relatively small gear 64 engaging a gear 65 fixed on shaft 23. The said similar shaft also has fixed thereon a friction clutch plate 66 cooperable with a plate 67 on a shaft 68 similar to shaft 41 with the exception that it is somewhat shorter than shaft 41 so that its end bearing 69 is entirely within wall 20. Shaft 68, adjacent bearing 69, has fixed thereon a relatively small gear 70 engaging a gear 71 fixed on shaft 27.

The hub of clutch plate 67 is engaged by a yoke 72, such as yoke 48 above described, this yoke being carried by a bell crank lever mounted as the first mentioned bell crank lever, of which the upwardly extending arm 73 engages the piston rod 74 of a dashpot 75, which may be similar in all respects to the dashpot above described.

A clutch plate 76 is fixed on the rear end of drive shaft 23 for cooperation with a plate 77 splined on the forward end of shaft 27. The hub 78 of plate 77 has an annular groove in which is disposed a shipper ring 79 having pins as at 80 engaged in the arms of a yoke 81 which forms the lower portion of a two-armed lever whose upper arm is designated at 82, this lever as well as the bell crank levers hereinbefore mentioned being pivotally supported by means of ears projecting forwardly from web 29. The upper portion of arm 82 has a semi-spherical rearwardly faced recess therein, Figure 1, engaged by the head of a plunger 83 slidable in a bore in web 29 parallel to shaft 27, the other end of the plunger having thereon a rounded head 84, Figure 1, on the opposite side of web 29.

Arm 82 has an upward extension 82' in connection with the piston rod of a dashpot 55 similar in all respects to the dashpots previously mentioned, and the arm portions 50 and 73 of the bell crank levers associated with discs 45 and 67, respectively, are engaged by the forward ends of plungers of exactly the same form as plunger 83 parallel to the latter and disposed in the same horizontal plane.

A compression spring 85, surrounding the reduced forward end portion of bearing 28', is interposed between the latter and hub 78 and tends to operatively engage plate 77 with plate 76 for the transmission of power from shaft 23 directly to shaft 27. Similarly disposed springs act similarly on plates 45 and 67. When the plungers are in their forward positions, as in Figure 1, all of the clutches are disengaged. When the plungers are permitted to move rearwardly, their associated clutches are respectively engaged by means of the springs as at 85. When the plungers are moved forwardly by means hereinafter described, their associated levers are moved to disengage the clutches. While the lever associated with clutch plate 77 has of itself a mechanical advantage superior to that of the bell crank levers associated with the other clutches, balanced action of all is secured by means of the cam effect of the slots in the yokes 48 and 72. The plungers associated with arms 50 and 73 of the bell crank levers are indicated at 86 and 87 respectively, Figure 3.

To the rear of web 29 a cam drum 88 is secured on a shaft 89 journaled in bearings 90 and 91 on the housing side walls, shaft 89 being horizontal with its axis in a vertical plane perpendicular to the axis of shaft 27. Drum 88 has four cams 92, 93, 94 and 95 secured thereon in circumferentially extending relation, each cam being provided with an interruption as will be hereinafter described.

Cam 93 is directly in advance of plunger 87, the latter constituting the follower for the cam. Similarly plunger 83 cooperates with the cam 94 and plunger 86 with cam 95. A spring-pressed plunger or follower 96 cooperates with cam 92, cam 92 and plunger 96 merely serving as means for yieldingly holding drum 88 in neutral position.

Figure 4:
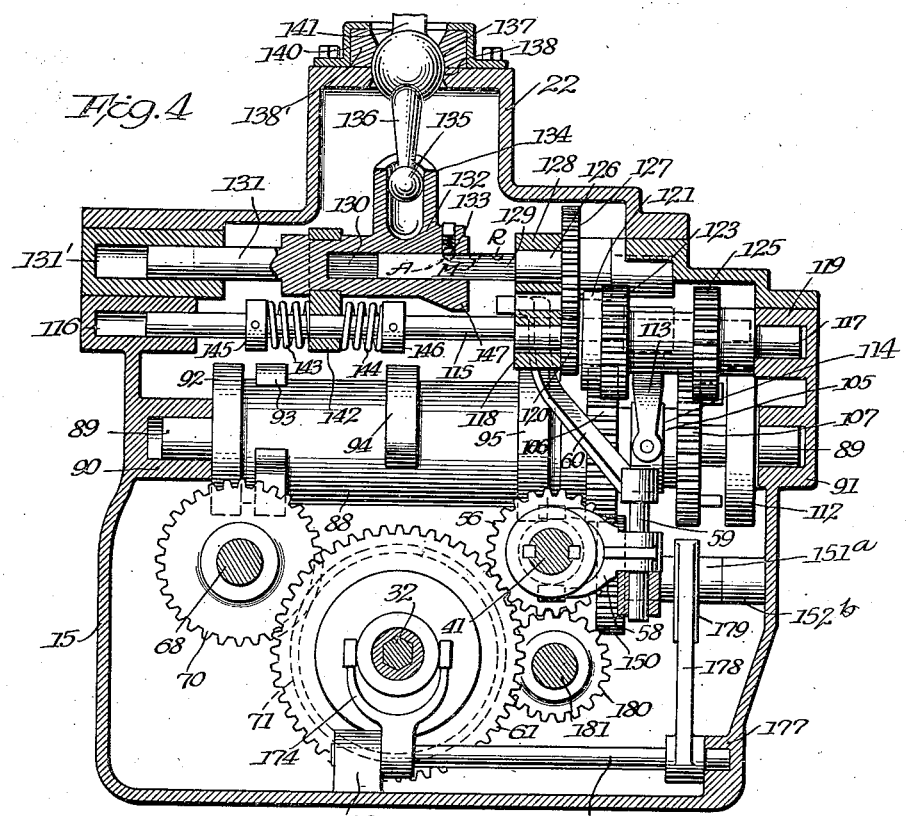
Figure 4 is a section substantially on line 4—4 of Figure 1.

Figure 9 is a view of drum 88 as seen from the left of Figure 4 and shows the extent of the cams and their profiles. The extent of cam 92 is indicated in Figure 9 by the arrow N. With the drum in neutral position, the end of the follower 96 rests on the drum surface in the interruption of cam 92. The cam has a leading bevelled face 97, its surface at its trailing end, 98, being substantially radial. With the drum rotated in the direction of the arrow X, Figure 9, the follower is relatively readily caused to ride up on face 97, although rotation of the drum in clockwise direction is prevented through abutment of the follower with face 98. The extent of cam 95 is indicated by the reference numeral 1, the adjacent ends of the cam being similarly sloped at 99 and 100, these slopes being relatively abrupt adjacent the drum and more acute thereabove. Cam 93 is similar to cam 95 and its circumferential extent and disposition is indicated by the arrow 2, its end surfaces being designated by reference numerals 101 and 102. The disposition and extent of cam 94 is indicated by the arrow 3. One end of cam 94 has a sloped surface 103 while the other has a radial surface 104. Cam 95 controls clutch 40, 45 which is the first speed clutch, cam 93 controls the second speed clutch 66, 67, and cam 94 controls clutch 76, 77 for direct drive, or third speed.

The drum, as shown in Figure 9, is in neutral position. Upon rotation in the direction of the arrow X, follower 96 rides up on its associated cam 92 and simultaneously follower 86 rides off of its associated cam 95 permitting the bell crank lever arm 50 to move rearwardly under the control of dashpot 54 and by reason of the action of the spring associated with clutch plate 45, plate 45 being thus engaged with plate 40. Hereupon rotation of shaft 23 is transmitted through gears 39, 38, clutch 40, 45 and gears 56 and 61 to shaft 27, so that the latter is driven at a low speed relative to shaft 23. This is first speed position. The second speed position is reached upon further rotation of drum 88 in the direction of the arrow X when follower 86 rides up on cam 95 and follower 87 rides off of cam 93, whereby clutch 40, 45 is disengaged and clutch 66, 67 is engaged. Hereupon drive from shaft 23 moves through gears 65, 64, clutch 66, 67 and gears 70 and 71 to shaft 27.

Upon further rotation of drum 88 in the direction of the arrow X, Figure 9, follower 87 rides up on cam 93 and follower 83 rides off of cam 94. Hereupon clutch 66, 67 is disengaged and clutch 76, 77 is engaged, so that there is a direct drive from shaft 23 to shaft 27.

If now drum 88 is rotated in clockwise direction and held in second position, clutch 76, 77 will be disengaged and clutch 66, 67 engaged, so that the transmission is again in second speed, first being attainable upon further drum rotation. However, if the drum is reversely rotated through the second speed position to the first without stopping, the second speed will not be engaged due to the lagging clutch action enforced by the dashpot 75.

Both automatic and manual means are provided for rotating drum 88 and these mechanisms will now be described.

Figure 5:
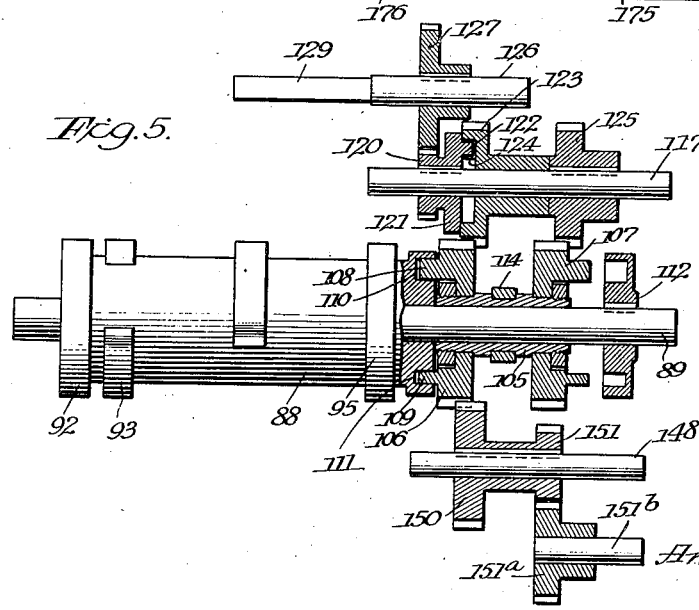
Figure 5 is a diagrammatic view showing drive gearing for clutch control mechanism.

Referring particularly to Figures 4 and 5, a sleeve 105 is rotatably mounted on shaft 89 between the right-hand end of drum 88 and bearing 91, sleeve 105 also being axially shiftable on the shaft. Freely rotatable on the ends of sleeve 105 is a pair of similar gears 106 and 107. Gear 106 has a pair of lugs 108 and 109 thereon engageable in mating recesses 110 and 111 in the end of drum 88, the lugs being of different form, as particularly shown in Figures 8 and 8a, so that gear 106 is engageable with drum 88 in only one angular position relative thereto. Gear 107 is provided with similar lugs engageable in similar recesses in a disc 112 fixed on shaft 89. A yoke 113 engages a suitable shipper ring 114 on sleeve 105 and is fixed on a reciprocable shaft 115 slidable in suitable bearings 116 and 116', Figs. 2 and 4. Shaft 115 is parallel to shaft 89 and upon reciprocation is adapted to engage either gear 106 with drum 88 or gear 107 with disc 112. The length of the lugs on each gear is such that upon movement of sleeve 105 from one extreme position to the other, the lugs of one gear will enter their associated recesses just prior to the time the lugs of the other gear leave their associated recesses.

On a counter-shaft 117 journaled in bearings 118 and 119 and parallel to shaft 89 is fixed a pinion 120 which has a hub portion carrying a disc 121 having an eccentrically disposed lug 122 projecting therefrom. A gear 123 rotatable on shaft 117 has a recess faced toward disc 121 and therein a lug 124 adapted to be abutted by lug 122 as disc 121 is rotated, see also Figures 7 and 7a. Gear 123 engages gear 106 and a gear 125 of the same size as gear 123 but fixed on shaft 117 engages gear 107. The relation of parts is such that gears 123 and 125 are engaged with gears 106 and 107 in all positions of the latter along shaft 89.

A counter-shaft 126 above shaft 117 and parallel thereto has fixed thereon a gear 127 and on each side of this gear shaft 126 is rotatable in bearings as at 128. The left-hand end 129 of shaft 126 is squared and received in a mating opening 130 in a sleeve 132 forming one end of a shaft 131 whose other end is rotatable and reciprocable in a bearing 131'. The sleeve 132 carries a spring-pressed detent 133 engageable in depressions in the squared end 129 upon reciprocation of shaft 131 relative to the latter, these depressions being indicated by the reference characters A, M and R, respectively. The sleeve 132 is formed with an upwardly projecting cupped portion 134, in which is received a ball 135 on the lower end of an arm 136 which projects beneath a ball portion 137 universally movable in a seat 138 formed between the top wall of head 22 and a block 138'. A cap piece 140 is secured on top of the head to hold the block in place and through an opening thereof projects an operating handle 141, which is integral, as here shown, with ball 137. Handle 141 is swingable axially of sleeve 132 and transversely thereof to reciprocate and rock the sleeve, respectively.

An arm 142 swiveled in a circumferential groove in sleeve 132 has a bore in which shaft 115 is received, arm 142 being abutted by compression springs 143 and 144 whose other ends bear against stop collars 145 and 146 fixed on shaft 115. At its right-hand end, Figures 1 and 4, sleeve 132 has a radially expanded portion 147 in the horizontal plane of the upper end of arm 60.

A counter-shaft 148 below shaft 89 and parallel thereto has its ends supported in bearings, not shown, and carries a pair of rigidly connected gears 150 and 151 of which the former is in constant mesh with gear 106, the latter meshing with a gear 151a on a shaft 151b mounted in a boss 152b.

Fixed on the rear end of shaft 27, Figure 1, is a disc 152 and a similar disc 153 is movable on the adjacent end of shaft 32. Defined between the periphery of disc 152 and a surrounding ring 154 are a number of rearwardly faced spherical recesses in which are received the spherical heads 157 of links 158 having at their other ends spherical heads 159 engaged in similar recesses formed between disc 153 and a surrounding ring 160. A compression spring 161 is seated in opposed annular grooves of discs 152 and 153 so that links 158 normally lie in radial planes of shafts 27 and 32 with disc 153 at maximum spacing from disc 152. Disc 153 is fixed on a sleeve 162, which is slidable on, but non-rotatable relative to, shaft 32. A collar 163 fixed on the other end of sleeve 162 has radial ears connected by means of rods 164 and 165 with the pistons of dashpots 166 and 167 which are fixed on shaft 32, and to such ears are also pivoted the links 168 of a centrifugal governor. This governor comprises also weights 169 and links 170 pivoted to ears on a collar 171 slidable on sleeve 162 and preferably splined thereon. A coil spring 172 surrounds sleeve 162 between collars 163 and 171 and may have one end anchored to the former, as shown.

Sleeve 171 has an annular groove receiving a shipper collar 173 which is suitably engaged by a yoke 174 fixed on a shaft 175 journaled in bearings 176 and 177, Figure 4. Also fixed on shaft 175 is an arm 178, which at its free end carries a segment gear 179 engaging gear 151a.

With detent 133, Figure 4, in the M position, the mechanism is set for manual control. Under these conditions, gear 107 is engaged with disc 112 and gear 106 is disengaged from drum 88. Upon swinging handle 141 to the right, Figure 1, sleeve 132 is rotated in a counter-clockwise direction through the ball and socket connection. Rotation of sleeve 132 is imparted to shaft 126 and thence through gear 127 to gears 120 and 125, which are fixed to shaft 117, and to gear 107. Lugs 122 and 124 are separated and hence gear 123 is not moved, but remains at rest together with gears 106, 150 and 151. However, gear 107 being engaged with disc 112, the drum is rotated from neutral to first, second and third speed positions as required.

In the case of automatic actuation, handle 141 is swung so that sleeve 132 is placed in the A position relative to shaft end 129. In moving from the M to the A position, rod 115 is similarly moved, so that gear 107 is disengaged from disc 112 and gear 106 is engaged with drum 88. Through suitable swinging of handle 141, sleeve 132 is now rocked through an angle equal to the angle through which it was previously rocked to bring the manual control into third speed. Hereupon lugs 122 and 124 come into engagement and upon further continued movement of the handle, rotation of gear 123 is imparted to gear 106 to move the drum from neutral to first speed position, whereupon drive is effected through the resilient coupling between shafts 27 and 32.

As the drum 88 is rotated, member 178 is swung upwardly through gears 106, 150, 151 and 151a so that collar 171 is moved to the right on sleeve 162. Spring 172 does not extend completely between collars 163 and 171 in the rest position, the described movement of member 178, however, bringing collar 171 against the adjacent end of the spring and since the load has commenced to move, the centrifugal force of weights 169 will keep collar 171 against the spring.

Under a heavy load, such as at starting, disc 152 will run ahead of disc 153 so that the latter is moved toward the former and sleeve 162 is correspondingly moved, thereby compressing spring 172 or moving collar 171 to the left, Figure 1, or both. The movement of collar 171 to the left under such conditions is limited to one-third or any other predetermined fraction of the possible movement of collar 72 under the action of fly-ball governor and, consequently, this movement of collar 171 to the left is compensated by the equivalent distance it may travel to the right without pressure by spring 172. Under light or normal loads, the disc device 152, 153 undergoes little or no distortion, spring 161 being sufficiently powerful to be compressed only under heavy load. Compression of spring 161 can proceed only to the point at which the forward end of sleeve 162 abuts the rear end of shaft 27. The principal control is effected through the fly-ball governor and it will be understood that this is so proportioned as to be able to effect adequate rotation of cam drum 88.

As an example of the operation, let it be assumed that the fly-ball governor employs first speed from 0 to 9 miles per hour, second speed from 9 to 21 miles per hour, and third speed from 22 miles up and that the torque-influenced governor is effective through one-third of the speed range. That is, its action is so limited in extent by the adjacent ends of elements 27 and 162 that its maximum effect on collar 171 is to move the latter only one-third of the distance that is required for the fly-ball governor to change from standstill to second speed or the distance of reciprocation of collar 171 in a speed change of three miles per hour. Under these conditions, the vehicle is propelled in first speed until nine miles per hour is reached, in second speed from nine to twenty-one miles per hour and in third speed thereafter. However, if the vehicle is being propelled in high speed at fixed throttle at twenty-four miles per hour, a heavy increase in load will cause the torque-influenced governor to move the collar 171 to the same position to which the fly-ball governor would have moved it at twenty-one miles per hour. The transmission will thus be changed from third to second speed in view of the increase in load as affecting the torque-influenced governor. If there is no increase in load, second speed will not be engaged until speed falls to twenty-one miles per hour. Similarly, under heavy load, first speed will come into use when speed declines to twelve miles per hour, whereas under normal conditions speed would have to drop to nine miles per hour before change to first. On the other hand, in accelerating the heavy load, the torque-influenced governor would also become effective and the apparatus would remain in first until twelve miles per hour and in second until twenty-four miles per hour.

The drum cannot be rotated past third speed position, due to the abutment of follower 83 with the radial face 104 of cam 94. Due to the shape of the cam ends the followers do not immediately rise on the inclines, but lag until sufficient force has been built up to enable a rapid movement of the drum to be made. Dashpots 166 and 167 permit free forward movement of sleeve 162, but retard its rearward movement relative to shaft 32.

When sleeve 132 is moved along shaft end 129 to position R, its expanded portion 147 strikes the end of lever 60, so that gear 56 is moved forwardly out of engagement with gear 61 and into engagement with an idler 180, Figure 4, mounted on a suitably supported shaft 181 and engaging gear 71 on shaft 27. Upon rocking sleeve 132, drum 88 is moved from neutral to first speed position, but, in view of the interposition of idler 180, shaft 27 is reversely driven. When sleeve 132 is moved from the R position, arm 60 and its associated parts are returned to normal position by means of a compression spring 182 which surrounds shaft 41 in advance of gear 56.

Shaft 23 is driven from any suitable prime mover, which in the case of a motor vehicle will ordinarily be an internal combustion engine. It will be evident that with a constant throttle opening the engine will tend to race while the load is released during a change speed operation, that is, when one clutch is disengaged and another is about to be engaged. In order to overcome this racing tendency, I preferably provide automatic control mechanism such as is shown in Figure 6. Referring to this figure, reference numeral 183 designates the intake manifold of an internal combustion engine and reference numeral 184 a pivoted butterfly valve for controlling the intake. The valve has an arm 185 secured thereto and connected by means of a link 186 with an arm 187 which, as here shown, is integral with a pivoted accelerator pedal 188.

Shaft 23 has formed thereon screw threads 189 which are engaged in the internally threaded bore of a relatively heavy sleeve member 190 which is free on shaft 23. A torsion spring 191 is interposed between the enlarged threaded portion of the shaft and the end wall of sleeve 190 and has its ends respectively anchored as shown. Sleeve 190 has a hub portion 192 provided with an annular groove in which is disposed a shipper ring 193 engaged by a yoke 194 formed at the extremity of one arm of a two-armed lever pivoted at 195. The other arm 196 of the lever extends above link 186 and has pivoted to its upper end a link 197 which extends through an eye formed in a lug 198 at the upper end of a pivoted plate 199. A stop collar 200 is fixed on the end of link 197 and a compression spring 201 is interposed between the stop collar and lug 198. An arm 202 is pivoted near the top of plate 199 on an axis parallel to the pivoting axis of the plate and at its lower end carries a swivel nut 203 which is provided with a bore through which link 186 freely passes. The nut 203 swivels on an axis parallel to the pivoting axis of plate 199 and is abutted at its sides by compression springs 204 and 205 respectively which surround link 186 and whose other ends abut stop collars 206 and 207 on the link.

In the illustrated position of parts valve 184 is partially open. Assuming shaft 23 to be momentarily uncoupled from the load, its speed is instantaneously jumped up. Due to its inertia the sleeve or nut 190 will be instantaneously drawn to the left against the action of spring 191, thus swinging arm 196 in a clockwise direction, so that plate 199 and arm 202 are swung in a clockwise direction and nut 203 bearing against spring 205 carries link 186 to the right, thus closing valve 184 against operating pressure on the pedal 188. By the time shaft 23 is again engaged with the load, spring 191 has returned sleeve 190 to its normal position relative to threads 189, so that as a result valve 184 resumes its original position. Due to the provision of the various springs, the accelerator pedal is operable without any obstruction, as will be understood. It will also be understood that the automatic actuating mechanism just described may be utilized with prime movers other than internal combustion engines. In the case of an electric motor for example a rheostat would replace the valve.

From the above it will be seen that I have provided speed change mechanism compactly combining automatic and manual control and being extremely sensitive to operating conditions. Collar 171, it will be seen, receives and integrates the reactions of the governor and the reactions of the resilient coupling, the latter resulting from changes in the relations of power and load and independently of any change in the speed of the governor, the movements of the collar being transmitted to the clutch control mechanism. Preferably the apparatus includes motor control means so that steady motor operation is secured. It is particularly pointed out that the invention is not limited to the specific form and arrangement of parts which have been above described by way of example, the scope of the invention being determined in the following claims.

I claim:

1. Means for transmitting rotary motion from a drive to a driven shaft, said means comprising an intermediate shaft, change speed gearing between the drive and intermediate shafts, a resilient coupling between said intermediate and driven shafts, a sleeve slidable on the driven shaft, a collar slidable on said sleeve, means for displacing said sleeve and therewith said collar when the driven shaft lags behind the intermediate shaft, speed responsive means operative to displace said collar on said sleeve, and gear changing mechanism operated in dependence upon movements of said collar.

2. Means for transmitting rotary motion from a drive to a driven shaft, said means comprising an intermediate shaft, change speed gearing between the drive and intermediate shafts, a resilient coupling between said intermediate and driven shafts, a sleeve slidable on the driven shaft, a collar slidable on said sleeve, means for displacing said sleeve and therewith said collar when the driven shaft lags behind the intermediate shaft, speed responsive means operative to displace said collar on said sleeve, and a rotary gear change control drum rotated in dependence upon movements of said collar.

3. Means for transmitting rotary motion from a drive to a driven shaft, said means comprising an intermediate shaft, change speed gearing between the drive and intermediate shafts, a resilient coupling between said intermediate and driven shafts; said coupling comprising a pair of mutually approachable coaxial discs, links connecting said discs, and a compression spring between said discs; said links serving as power transmission means between the discs and acting to mutually approach the discs to an extent determined by conditions of power and load, and means moved in dependence upon the relative movements of the discs for effecting speed change.

4. Means for transmitting rotary motion from a drive to a driven shaft, said means comprising change speed gearing between the shafts, a rotary drum having cams thereon for controlling said gearing, automatic means for rotating said drum, and manually operable means for rotating said drum, said manually operable means including a lever operable also to initiate operation of said automatic means, the same cams of said drum being operative upon either automatic or manual rotation of said drum.

5. Means for transmitting rotary motion from a drive to a driven shaft, said means comprising change speed gearing between the shafts, a rotary drum having cams thereon for controlling said gearing, automatic means for rotating said drum, manually operable means for rotating said drum, said manually operable means including a lever operable also to initate operation of said automatic means, the same cams of said drum being operative upon either automatic or manual rotation of said drum and means for effecting reverse rotation of the driven shaft comprising a reverse gear shiftable by said lever.

6. Means for transmitting rotary motion from a drive to a driven shaft, said means comprising change speed gearing between the shafts, control means for said gearing comprising a rotary cam drum, a shaft on which said drum is fixed, a pair of gears freely rotatable on said shaft and shiftable axially thereof, abutment means fixed on said shaft outwardly of said gears, means for shifting said gears simultaneously, clutch means engaging one of said gears and said drum upon shifting movement of the gears toward the drum, clutch means engaging the other of said gears and said abutment means upon shifting movement of the gears away from the drum, an automatically rotatable gear in constant mesh with one of said gears, and a manually rotatable gear in constant mesh with the other of said gears, whereby said drum is rotatable automatically or manually.

7. Means for transmitting rotary motion from a drive to a driven shaft, said means comprising change speed gearing between the shafts, control means for said gearing comprising a rotary cam drum, a shaft on which said drum is fixed, a pair of gears freely rotatable on said shaft and shiftable axially thereof, abutment means fixed on said shaft outwardly of said gears, means for shifting said gears simultaneously, clutch means engaging one of said gears and said drum upon shifting movement of the gears toward the drum, clutch means engaging the other of said gears and said abutment means upon shifting movement of the gears away from the drum, a counter-shaft parallel to said drum shaft, a pair of gears on said counter-shaft constantly meshing with the first-named gears respectively, one of said last-mentioned pair of gears being fixed on said counter-shaft and the other having a lost-motion connection with said counter-shaft, and an automatically controlled gear in constant mesh with said one of said first-mentioned pair of gears, said counter-shaft being manually rotatable throughout its speed changing range prior to the closing of said lost-motion connection whereupon, said one of said first-mentioned pair of gears being in engagement with said drum, continued rotation of said counter-shaft is effective to rotate said drum to first speed position.

8. Structure according to claim 7 wherein a single handle serves as shifting means for the first-mentioned pair of gears and as means for rotating said counter-shaft.

9. Structure according to claim 7 wherein a single handle serves as shifting means for the first-mentioned pair of gears and as means for rotating said counter-shaft and wherein an axially reciprocable and rockable member is controlled by said handle to effect said last-named operations.

10. In apparatus of the class described, a drive shaft and a driven shaft, change speed gearing between said shafts including a clutch for each speed, an actuating cam for each clutch, a shaft on which said cams are fixed, means for rotating said cam carrying shaft to cause successive operation of said clutches, and dashpots associated with the clutches whereby upon uninterrupted drum rotation an intermediate speed position may be passed through without operative actuation of the associated clutch.

11. Means for transmitting rotary motion from a drive to a driven shaft, said means comprising an intermediate shaft, change speed gearing between the drive and intermediate shafts, a sleeve slidable and non-rotatable on said driven shaft, a member slidable on said sleeve and rotatable therewith, a drive coupling between said intermediate shaft and said sleeve, said coupling acting to displace said sleeve and therewith said member when the driven shaft lags behind said intermediate shaft, speed responsive means operative to displace said member on said sleeve, displacement of said member under the influence of said speed responsive means being in a direction opposite to displacement of said sleeve upon lag of said driven shaft, and gear changing mechanism operated in dependence upon movements of said member.

12. Means for transmitting rotary motion from a drive to a driven shaft, said means comprising an intermediate shaft, change speed gearing between the drive and intermediate shafts, a sleeve slidable and non-rotatable on said driven shaft, a member slidable on said sleeve and rotatable therewith, a coupling between said intermediate shaft and said sleeve, said coupling acting to displace said sleeve and therewith said member toward the intermediate shaft when the driven shaft lags behind said intermediate shaft, abutment means fixed on said sleeve on the side of said member remote from said intermediate shaft, speed responsive means connecting said member and said abutment means, a compression spring surrounding said sleeve between said member and said abutment means, displacement of said member with said sleeve being effected through said spring, said speed responsive means being operative to displace said member on said sleeve away from said intermediate shaft, and gear changing mechanism operated in dependence upon movements of said members.

ANTHONY P. KEARNS.